United States Patent [19]

Young

[11] 4,026,695
[45] May 31, 1977

[54] PARTICULATE MULTICOMPONENT SOIL ADDITIVE

[75] Inventor: Donald C. Young, Fullerton, Calif.

[73] Assignee: Union Oil Company of California, Brea, Calif.

[22] Filed: Feb. 24, 1975

[21] Appl. No.: 552,226

[52] U.S. Cl. .................................. 71/28; 71/29; 71/53; 71/64 F; 423/396
[51] Int. Cl.² .......................................... C05C 9/00
[58] Field of Search ............... 71/28, 29, 53, 64 E, 71/64 F; 260/125; 423/396

[56] References Cited

UNITED STATES PATENTS

| | | |
|---|---|---|
| 2,074,880 | 3/1937 | Whittaker et al. ............... 71/28 X |
| 3,149,956 | 9/1964 | Seymour et al. ............... 71/29 |
| 3,580,715 | 5/1971 | Dilday ............... 71/28 |
| 3,617,239 | 11/1971 | Klanica ............... 71/28 |
| 3,867,124 | 2/1975 | Church ............... 71/28 X |

*Primary Examiner*—Frank A. Spear, Jr.
*Assistant Examiner*—Ferris H. Lander

*Attorney, Agent, or Firm*—Richard C. Hartman; Dean Sandford; Michael H. Laird

[57] ABSTRACT

This invention relates to a particulate multicomponent soil additive, a method of applying that additive to soils to improve the agronomic quality of the same, and methods of producing such multicomponent soil additives. The compositions comprise particle-form combinations of calcium sulfate and a nitrifier selected from urea, ammonium nitrate, and combinations of these, in which the nitrifier particles are coated with a layer of the reaction product of hydrated calcium sulfate and urea, ammonium nitrate, or both. This layer, in turn, contains an additional soil additive such as elemental sulfur or the major and minor plant nutrients such as phosphorus, potassium, magnesium, copper, zinc and the like. The particles are produced by reacting the particle-form nitrifier, preferably urea or ammonium nitrate prills, with hydrated calcium sulfate intimately mixed with one or more additional soil additives. Reaction is promoted by heating to a temperature sufficient to initiate the endothermic reaction without melting or thermally decomposing the nitrifier.

14 Claims, No Drawings

PARTICULATE MULTICOMPONENT SOIL ADDITIVE

BACKGROUND OF THE INVENTION

The several components of these compositions are widely used as plant nutrients or soil additives, e.g., for modifying soil acidity or converting nutrients present in the soil to available forms. Similarly, urea and ammonium nitrate particles are widely available commercially and are generally applied to the soil as such. However, it is often desirable to apply several additives, such as the major or minor nutrients, simultaneously. This can be simply accomplished with a physical mixture of powders or particles of the several components. One disadvantage of this approach is the practical impossibility of obtaining a mixture of sufficiently uniform particle size to prevent settling and segregation of the several components during transportion, storage or use. I have also discovered that this procedure does not take advantage of at least one factor governing the availability of plant nutrients to crops. For instance, many soils are generally basic in character, i.e., have pH levels above about 8.0, while one or more plant nutrients either present in the soil or added in a convenient, inexpensive form, may be relatively immobile, i.e., water insoluble, under basic conditions.

The mobility of these nutrients and, consequently, their availability to the crops, can be increased by reducing soil pH. This is accomplished to some extent by the action of nitrifying bacteria on urea or ammonium nitrate by which all the nitrogen is converted to available nitrates. However, this effect is apparent exclusively, or at least primarily, only in the immediate vicinity of the nitrifier particles. Consequently, the distribution of nutrients or other soil amendments by application of a physical mixture would not place the basic, immobile additives such as magnesium oxide, iron sulfate, manganese sulfate, etc., in close enough proximity to the urea particles to take the greatest advantage of the reduction in soil pH occurring in the immediate vicinity of those particles. The increased mobility associated with acidification occurs even if the additional soil additives or nutrients are added in soluble or mobile forms. Such materials might otherwise be converted to the insoluble, basic forms in a basic environment.

One obvious solution to this problem would be to combine the additional soil additive with the nitrifier in the form of a particle during the production of the nitrifier particle itself.

This could be done presumably by mixing the addditive with the melt or solution during the prilling operation. This is often impossible, however, due to the incompatibility of some soil additives, e.g., elemental sulfur, and molten urea or ammonium nitrate. Secondly, it introduces complexities into the prilling operation which may or may not be easily solvable or economically acceptable. These procedures usually involve large scale, continuous operations which would have to be interrupted periodically to produce custom formulations of different compositions as the demand required.

Due to the wide commercial availability of nitrifier particles as such, it would, of course, be most desirable to devise a method by which the additional plant nutrients of soil additives could be combined with the particles on a small scale without appreciable difficulty, a method that would not interfere with the large scale particle production in the first instance. However, this approach is also complicated by several factors, primarily the physical structure of these particles and their incompatibility with other soil amendments.

For instance, the prills have extremely low porosity, essentially no surface porosity for practical purposes. Thus very little if any material can be added to the particle surface by a simple procedure. Nor can these materials be added practically by using aqueous solutions since these nitrifiers are hygroscopic, adsorbing water very rapidly and dissolving or becoming sticky and cohesive at very low water levels which would instantly result in the formation of an unhandleable cemented mass.

It thus remains to attempt the combination of nitrifier particles and the additional soil amendments by some procedure that does not require the use of free water to dissolve those components. This might be accomplished by melting the additional soil additive, which effectively eliminates essentially all of these additives. Even the one that might meet this criteria, sulfur, is not compatible even in the molten form.

These difficulties have not completely eliminated all efforts to produce such materials. One suggested approach involves coating urea particles with wax and then introducing the additional soil amendments which adhere to the wax coating. The prior art accurately observes, however, that in order to produce a coating which is sufficiently cohesive to retain the additional components, one also produces particles which agglomerate, thereby introducing obvious complications and disadvantages. The prior art also suggests that agglomeration can be overcome, at least to some extent, by adding clays such as keiselguhr to the combination of urea, wax and sulfur or other additive. While to some extent accomplishing the objective, this approach introduces numerous obvious complications. It requires the addition of materials such as waxes and clays which have little or no utility in the final product (except for water-proofing if desired) resulting in increased manufacturing cost and expense of shipping, handling and application.

It is therefore an object of this invention to provide an improved, particulate multicomponent soil amendment containing urea or ammonium nitrate, calcium sulfate and at least one additional soil additive or plant nutrient. Another object is the provision of a simple procedure for producing such multicomponent soil amendments. Another object involves the provision of a method for producing intimate mixtures of soil nitrifiers, calcium sulfate and one or more additional soil additive and/or plant nutrients from readily available materials such as commercially available prills. Another object is the provision of an improved method for applying agronomically effective amounts of soil amendments and/or plant nutrients to the soil. A preferred objective is the provision of multicomponent particulate soil amendments containing urea, calcium sulfate and additional soil additives in which the additional additives are in such close proximity to the urea that maximum benefit is derived from the acidic environment created in the immediate proximity of the urea particle by nitrification.

DETAILED DESCRIPTION OF THE INVENTION

I have now discovered that multicomponent, particulate fertilizer compositions containing a nitrifier selected from urea or ammonium nitrate, or both, calcium sulfate and one or more additional soil additives or plant nutrients can be produced from commercially available nitrifier particles by intimately mixing hydrated calcium sulfate with the additional soil amendments or plant nutrients and nitrifier particles, and heating this combination to a temperature sufficient to promote the reaction of the calcium sulfate and urea or ammonium nitrate. Surprisingly, the additional soil amendments, i.e., other than calcium sulfate and nitrifier, which alone will not combine with the nitrifier particles, firmly adhere to or are encapsulated in the resulting product phase. There is little reason to anticipate this result. The reaction apparently does not involve the additional components which do not interact chemically with either calcium sulfate or the nitrifiers under these conditions. Secondly, the reaction presumably proceeds at the calcium sulfate-nitrifier interface beyond which the third components would not seem to penetrate. Thus, it would not be expected that, nor is it presently understood how, these components are captured and retained by the reaction product. Nevertheless, they are retained, presumably in the reaction product and in close association with the nitrifier. It was also surprising to observe that even though the additional soil amendments are strongly retained in the urea-calcium sulfate reaction product layer, the particles themselves do not adhere at all so that particle agglomeration is not a problem.

In accordance with another embodiment of this invention, I have discovered that the multicomponent particulate soil amendments described herein make maximum use of the acidic environment created in the immediate proximity of the nitrifier. Thus, even in the most basic soils, soil additives which would otherwise are or would be converted to immobile, water-insoluble basic forms are either maintained or improved to an extent not otherwise possible. Moreover, this objective is accomplished without the need for applying sufficient acid, urea or other acidifying substance in the amounts that would be necessary to reduce soil pH generally. This need is avoided by applying the plant nutrients in the described particles so that they are retained in the immediate vicinity of the nitrifier which reduces soil pH in the vicinity of the plant nutrients, thereby maintaining their availability to the crops.

All of these advantages can be obtained by using readily available commercial products such as urea prills. These compositions and methods product the greatest degree of pH reduction over a longer period of time than can be accomplished with any alternative material. They afford a procedure by which plant nutrients can be added in inexpensive, commercially available, basic (insoluble or only slightly soluble) forms, while maximizing their conversion to mobile, available forms. They also allow the formation of single particles of materials which are otherwise incompatible, e.g., sulfur and urea. In fact, this particular embodiment, the combination of urea, calcium sulfate and elemental sulfur, is particularly preferred, especially in the presence of the basic forms of other plant nutrients. The oxidation of the elemental sulfur to sulfuric acid further contributes to the reduction of soil pH in the vicinity of the fertilizer particle, thereby contributing to the benefits of acidification.

Another advantage also results from the increase in particlesize accompanying this procedure. The problems associated with handling the smaller commercial prills and additive powders are reduced commensurately. The size of commercially available prills is limited by the characteristics of commercial processes with the exception of the so-called "onionskin process." In that procedure, layers of urea are successively built up to product particles of ever-increasing size. However, from an agronomic standpoint, this process suffers from a significant disadvantage — the unavoidable buildup of biuret.

The additives which can be incorporated in these compositions, i.e., materials other than urea, ammonium nitrate and calcium sulfate, do not, in and of themselves, constitute an essential aspect of this invention beyond the extent that they are included as third components and can be retained due to the characteristics of the nitrifier-calcium sulfate combination. These materials are generally well known in the art and include any compounds, or for that matter elements themselves, which are desirably added to the soil and which do not excessively reduce particle strength.

Thus, the selection of the supplemental additive is, for the most part, a matter of choice. Their effect on the structural stability of the final product can be easily evaluated by preparing a sample composition and determining whether or not the resultant particles possess sufficient strength to satisfy the user. However, in the great majority of cases, and in the case of all the components mentioned specifically herein, the additives can be combined at practical concentrations without unduly reducing particle strength. In fact, some additives such as elemental sulfur, actually improve the structural stability of the combination. This, in itself, seems a paradox in view of the fact that elemental sulfur does not bond at all with the prills in the absence of calcium sulfate.

Additives which are specifically contemplated within the scope of this invention include the major plant nutrients, the so-called micronutrients, and other soil modifiers such as elemental sulfur. The major nutrients include phosphorous and potassium. Other additives include boron, calcium, iron, magnesium, manganese, copper, zinc and molybdenum. Phosphorus is usually added in the form of phosphates, preferably as the mono- and dihydrogen phosphates of basic cations such as ammonium, calcium, zinc, copper, potassium, iron, manganese, magnesium and boron. The polyphosphates of these cations can also be employed, e.g., ammonium polyphosphates.

Minor amounts of phosphoric acid can also be used. However, due to the susceptibility of the nitrogen source to attack by strong acids and/or oxidizing agents, the amount of phosphoric acid, sulfuric acid or strong oxidizing agents such as nitric acid should be minimized in order to prevent reaction between those agents and the nitrifier.

Boron can be added in numerous forms. Illustrative of these are the several forms of boric acid, e.g., meta, ortho and tetra acids, boron oxide and the borates of basic cations such as ammonium (penta and tetra), calcium, sodium, potassium, magnesium, zinc and copper.

In addition to their use as either phosphates or borates or both, the additional metal nutrients can be added as the corresponding oxides, sulfates, sulfites, hydroxides, carbonates, nitrates and carboxylates of $C_1$ to $C_8$ mono- and dicarboxylic acids. The carboxylic acid moiety is preferably a hydrocarbyl carboxylic acid group. However, acids can be employed which contain non-toxic substituents such as ammonium and nitrosyl groups. The toxicity of such substituents is generally well known and can be readily determined by simple greenhouse or field tests comparing compositions containing such substituents to materials of known toxicity to the selected crop.

These methods and compositions are particularly suited to the use of basic forms of the additional supplements. By this is meant compounds which are more soluble in more acidic environments than in basic environments. Solubility, and the effect of pH on solubility are, of course, matters of degree. Some additive compounds are more soluble at lower pH levels. Thus, these methods increase the solubility of such basic compounds due to the decreased pH of the environment immediately adjacent the fertilizer particle. Illustrative basic compounds which are more soluble at lower pH levels are the oxides, hydroxides and carbonates of the metal cations referred to above, including potassium, manganese, magnesium, copper, zinc, iron, molybdenum and boron.

The concentration of the respective components is determined primarily by two considerations. The first, of course, is the identity of the additional additives. Some of these can be used in higher concentrations than others. Thus, if high concentrations are desired it would be wise to evaluate the affect of the additives on particle strength at several concentrations. Numerous procedures are available for evaluating structural stability, e.g., crushing strength or fragmentation of such particles. Thus, comparative tests can be made simply by producing particles of several different compositions and determining whether or not the resultant particle has the desired strength.

As a general rule, however, these compositions should contain at least about 40, preferably about 40 to about 90 weight percent urea, ammonium nitrate, or combination thereof, based on a total weight of the final product. For convenience, the nitrifier concentration is defined by reference to urea or ammonium nitrate, per se, it being appreciated that some or all of the nitrifier is converted to a chemical combination with calcium sulfate.

Secondly, the urea or ammonium nitrate starting material should be a particle form material, preferably commercially available prills generall having diameters ranging between about 5 and about 30 standard mesh sizes. Although it is not essential to the concept of this invention, the nitrifier particles can also contain minor amounts of impurities or other constituents which may or may not contribute to the strength or agronomic activity of the final product. Such materials are not generally employed, however, due to the added expense involved in producing such particles and the relative economic advantage afforded by the lower cost of substantially pure urea or ammonium nitrate prills.

In view of the desirability of maintaining a particle form material generally representing the desired form of the final product, it is preferred that the starting materials and process conditions be sufficiently anhydrous to avoid dissolving or melting the nitrifier or producing a cohesive particle which might promote agglomeration. This is not to say that the system must be completely anhydrous. On the contrary I have discovered that better results are obtained if minor amounts of free water are present originally.

Several factors are involved in establishing the optimum free water content. This water level should be sufficient to convert all of the calcium sulfate to the dihydrate which is believed to be the reactive species in this procedure. While the conversion of calcium sulfate or the hemihydrate form of this compound to the dihydrate even in the presence of adequate free water at ambient conditions is relatively slow, it proceeds to completion quite rapidly in a matter of several minutes at elevated temperatures, e.g., 100° F. or higher. Thus, the hydration level of the calcium sulfate must be taken into consideration in determining the amount of free water added to or retained in the system. This water level, however, should not be so great as to either dissolve any substantial amount of the urea or ammonium nitrate or to so reduce the melting point of the nitrifier, e.g., urea, that it becomes molten in the reaction system.

I have observed, as illustrated in the demonstrative examples presented hereinafter, that the presence of excess free water in the reaction system either lowers the urea melting point or enhances its solubility at elevated temperatures such that a molten or dissolved mass is created at the reaction temperatures employed. The amount of water added to the system should not be so high as to induce this result. Thus, as a general rule the initial free water level should not exceed about 15 weight percent of the total weight of nitrifier and calcium sulfate. The optimum water level is best determined empirically since it is influenced by the initial hydration level of the calcium sulfate reactant as well as the nature of impurities in either the calcium sulfate, urea or ammonium nitrate which themselves may be convertible to hydrated forms thereby competing with the calcium sulfate for available water. This determination can be made very easily by performing a series of tests using the available calcium sulfate, nitrifier and other desired components and adding different levels of water to the reaction mixture either prior to or during heating to the reaction temperature. An insufficient water level will be indicated by excessive dusting of the components and the lack of complete reaction and formation of non-uniform particles. An excess water level will be indicated by the production of agglomerates or a sticky mass of materials resulting from the melting and/or dissolving the nitrogen source.

The calcium sulfate is employed in finely divided form, preferably as a powder, and is preferably at least partially hydrated. The most common hydrates are the hemihydrate, commonly known as plaster of paris, and the dihydrate known as gypsum. Of course, the calcium sulfate can comprise a combination of the hemi- and dihydrate. The calcium sulfate is added in amounts corresponding to about 10 weight percent, preferably at least about 20 weight percent based on the total weight of the final composition. Anhydrous calcium sulfate can also be employed as a starting material, provision being made for hydration in situ. This can be accomplished by adding sufficient amounts of water to the calcium sulfate per se or to the entire reaction mixture or by the injection of steam to accomplish both the addition of water and temperature elevation. However, care should be taken in view of the reasons discussed above to prevent the accumulation of sufficient free water to dissolve or agglomerate the nitrifier particles.

The additional, or third components, may also be combined in widely varying proportions, the preferred ranges depending primarily on the identity of the additive itself. It should be recognized, however, that any combination of these additives can be used in a single composition. Elemental sulfur is used as a finely divided, preferably powdered form in amounts corresponding to at least about 2, generally at least about 5, and preferably between about 2 and about 20 weight percent based on total weight. Phosphorous and potassium, both major nutrients, are usually employed in concentrations corresponding to about 0.5 to about 10 weight percent $P_2O_5$ or $K_2O$, respectively. The remaining constituents constitute only a minor amount of the total composition, usually between about 0.1 and about 3 weight percent determined as a metal.

As a general rule the total additive concentration, at its maximum, should be roughly equivalent to the calcium sulfate content. Thus, a product containing, for example, 20 weight percent calcium sulfate should not contain substantially more than 20 weight percent of all other additional additives combined. This general rule is not without exception, however, due to the fact that some of these materials, such as elemental sulfur, actually contribute to particle strength up to a point.

The resulting particles can be applied to the soil as such after which they are slowly degraded by bacterial nitrification or solution of the urea or ammonium nitrate by moisture in the soil. However, it is sometimes preferable to reduce the rate at which the nitrogen-containing compounds are nitrified or dissolved. This is particularly true in areas exposed to heavy rainfall or irrigation in which a substantial percentage of the nitrogen-containing compounds may be leached out and lost. Nitrifier loss can be reduced by either coating the particles or combining with the original components a hydrophobic material which serves to limit the access of water to the particle interior. Numerous materials of this sort are well known and thus do not require extensive characterization. The most widely used hydrophobic substances for reasons of economics and availability are the hydrocarbon or vegetable waxes and oils, including asphalt, polysilicones, which have found wide commercial application as moisture shields, and other similar materials which do not react with these multicomponent fertilizers and which are not intolerably toxic to crops.

The degree of moisture inhibition achieved by this procedure constitutes another aspect of this invention. A much superior hydrophobic coating can be obtained than is possible with either urea or ammonium nitrate prills per se. This is apparently due to the increased porosity of the particle exterior remaining after the interaction of calcium sulfate and the nitrifier. The degree of moisture exclusion depends in part on the identity of the hydrophobic material but is primarily a function of the amount of this material combined with the particles. Obviously, some degree of improvement is achieved at even very minor concentrations. However, as a general rule, the compositions will contain about 5 to about 20 weight percent of the hydrophobic substance.

These materials can be combined with the fertilizer particles by simply mixing the particles with the hydrophobic substance if it is fluid under ambient conditions. Obviously, in some instances it is necessary to raise the temperature to a level sufficient to melt the hydrophobic substance in the case of waxes, asphalts, etc., to promote adequate mixture. In the alternative, the hydrophobic material can be mixed with a reactant mixture, e.g., calcium sulfate and nitrifier, prior to their interaction. This can be accomplished, for example, by mixing the oil or a melted wax or asphalt, or the like, with the calcium sulfate and then reacting the combination with the selected nitrifier particles. The hydrophobic material will thus be incorporated throughout the reaction product layer increasing its water resistance and reducing the rate at which the nitrifier is converted by enzymatic activity and dissolved into the ground water. This latter alternative is particularly preferred since water resistance is obtained with only nominal, if any, particle adhesion or agglomeration.

While any of these combinations can be employed directly as soil adjuvants without further qualification, the artisan will readily observe that the majority of the commercially available hydrophobic materials are reducing agents and some of the third components such as copper, chromium, iron and molybdenum are known to activate ammonium nitrate. Thus, the combinations of these components, either reducing agents or activators, and ammonium nitrate, are classified as explosives and should be handled, if at all, with extreme caution. That factor alone does not reduce the agronomic activity of these combinations. However, it obviously renders them much less attractive than the equally active alternative urea compositions in view of the precautions that must be taken in handling the potentially explosive materials.

Accordingly, the preferred compositions and methods are those in which the nitrifier contains no ammonium nitrate or in which the nitrifier consists essentially of urea. Nevertheless, the ammonium nitrate-containing compositions can be used if sufficient precautions are taken to avoid detonation. Moreover, a number of the compositions do not require the combination of reducing or activating agents with the ammonium nitrate. For instance, several of the third components are not known to activate or reduce ammonium nitrate. These include borates, phosphates and compounds of potassium, calcium and magnesium.

The reaction can be carried out by intimately mixing the several components and heating them to a temperature at which the endothermic reaction proceeds. This temperature can be readily determined by a sharp temperature drop in the solid phase induced by the occurrence of the endothermic reaction and the evolution of water of hydration released from the hydrated calcium sulfate. The reaction usually proceeds at temperatures of about 160° F. with urea and about 220° F. with ammonium nitrate, or higher. However, it is often desirable to heat the solids mixture to a temperature at least 210° F. to drive off free water introduced by the release of water of hydration. This temperature should not exceed the temperature at which the nitrifier is melted or thermally decomposes. As mentioned above, excess free water can depress the apparent melting point and must be taken into account. Furthermore, the reaction apparently requires a minor induction period and/or the initial reaction rate is relatively slow. As a consequence, excessive heating rates should be avoided so that the melting or thermal decomposition points of the nitrifier are not reached before the reaction proceeds to completion. This complication can be simply avoided, however, by heating the mixture to or slightly above the temperature at which reaction is known to take place and holding the mixture at that temperature until the reaction is complete. This temperature can be determined by the testing procedure described above, e.g., operating at several different temperatures, either at the same or different initial free water levels, and determining, by observation, the temperature at which reduction takes place and the temperatures that must be avoided to prevent melting and/or thermal decomposition of the nitrifier. When elemental sulfur is added, it is preferred, although not essential, that the temperature be increased to, or above the sulfur melting point, e.g., about 234° to about 248° F., depending on the form of sulfur used.

I have found that even though this reaction promotes the formation of very strong aggregates, it does not promote adhesion of the nitrifier particles themselves. Any slight tendency toward agglomeration that may exist can be easily avoided by agitating the mixture such as by mechanical agitation, fluidization, or the like.

While it is desirable to expel free water from the composition, it of course would be recognized that the product may contain some adsorbed water. The reason for this precaution is, as mentioned above, to avoid dissolving the nitrifier. Thus, water levels below those at which a significant amount of the nitrifier is dissolved are acceptable.

The particles can be applied to the soil by any one of numerous well known procedures and in any effective amount. Methods and levels of application are well known and do not constitute an essential aspect of this invention. Thus, the particles can be used to improve and condition soils in the presence or absence of standing crops by adding an agronomically effective amount of the particulate soil amendment, generally at levels of at least about 10 pounds per acre, preferably about 20 to about 500 pounds per acre. These methods and compositions are particularly suitable for use on basic soils due to the activating effect of the acidic environment created in the immediate vicinity of the particles in the soil. Accordingly, a preferred method involves adding an agronomically effective amount of the particulate soil amendment to soils having pH levels above about 7.

The following examples demonstrate several specific embodiments of the methods and compositions of this invention and illustrate several of the concepts involved.

EXAMPLES 1 THROUGH 6

These six examples were conducted in a rotary mixer externally heated by radiation from two 250 watt infrared heat lamps and the contents were agitated with a mechanical stirrer. Each run employed 225 grams of urea and 75 grams of crude gypsum as received containing 21.5 weight percent water determined by weight loss upon heating at 100° C. for 16 hours. Varying amounts of additional free water were added to the reaction mixture of urea and gypsum in Examples 1 and 3–6. In Example 2 the gypsum was dried for 16 hours at 100° C. before use. All materials were mixed together, gradually heated to 250° F. and then post-mixed 2 minutes after heating was discontinued. The results of these operations are summarized in Table 1.

Table 1

| Example No. | $H_2O$, wt. % on Gypsum | Product |
|---|---|---|
| 1 | 5 | uniform coated prills |
| 2 | dried | dusty uncoated prills |
| 3 | 20 | melted mass[(1)] |
| 4 | 10 | well coated prills |
| 5 | 7.5 | well coated prills |

Table 1-continued

| Example No. | $H_2O$, wt. % on Gypsum | Product |
|---|---|---|
| 6 | 8.5 | well coated prills |

[(1)]prills agglomerated at about 125° F. and dissolved and/or melted into a molten mass at 140° to 180° F. then reverted to globs, shut down at 210° F.

These operations illustrate several aspects of this invention. For instance, Example 2 illustrates that the crude gypsum absent the free water present in that material as received did not contain sufficient water of hydration to react with the nitrifier prills. There was no free water in the system by which the gypsum could be hydrated as the reaction temperature was elevated. Visual inspection indicated the lack of any reaction between calcium sulfate and nitrifier particles and the presence only of a dusty mixture of the starting materials.

Twenty weight percent additional water based on gypsum weight was added in Example 3. This amount was excessive in this formulation. The urea prills dissolved and formed a melted or dissolved agglomerate of calcium sulfate and urea. The desired particle form was completely lost. Examples 4 through 6 employing intermediate water levels, e.g., 7.5 to 10 weight percent, produced well coated particle-form combinations of gypsum and urea. This material consisted of very strong particle combinations of the two reactants. The particles consisted of a central core of urea surrounded by the crystalline reaction product of gypsum and urea.

This series of operations also illustrates, generally, that the degree of gypsum hydration or, conversely, the amount of free water present in the system and thus available for hydration in situ, has a significant influence on the degree of reaction obtained, the amount of dusting (resulting from unreacted gypsum) and the degree to which the nitrifier particles are melted or dissolved. If the gypsum starting material were completely hydrated, little or no additional free water would be required. Conversely, if the gypsum is completely dehydrated, substantial amounts of water are required which, however, should not exceed the amount that will result in significant dissolving or melting of the nitrifier particles. These examples also illustrate a simple screening procedure by which the optimum amount of free water can be readily determined. Thus, the amount of free water required with other starting materials or proportions could be easily determined by a similar series of operations in which varying amounts of free water are added while observing the effect on product properties.

EXAMPLES 7 THROUGH 12

These six examples illustrate the preparation of particle-form composition containing calcium sulfate, elemental sulfur and the nitrifier, in this instance urea. These compositions were prepared by the procedures prescribed in Examples 1 through 6. Starting materials including the crude gypsum (as received), reagent grade sublimed sulfur, urea prills and added free water were mixed in the rotary mixer and heated as described. The proportions of each component and the results obtained are summarized in Table 2.

Table 2

| Ex. No. | S, Wt. % | Temp., °F. | H₂O⁽¹⁾ | Product |
| --- | --- | --- | --- | --- |
| 7 | 5 | 247 | 8.5 | evenly coated particles |
| 8 | 10 | 248 | 8.5 | minor agglomeration |
| 9 | 10 | 248 | 10.0 | evenly coated particles |
| 10 | 20 | 247 | 10.0 | some particle segregation and dust |
| 11 | 15 | 242 | 10.0 | substantial fines and uneven particle coating |
| 12 | 10 | 248 | 10.0 | evenly coated particles with some fines |

⁽¹⁾weight percent on gypsum

These procedures illustrate that elemental sulfur can be entrained or otherwise incorporated into the reaction product layer of calcium sulfate and the nitrifier to form a unitary particle of the three components. Visual and microscopic inspection of the product particles illustrate that the central urea core is surrounded by a crystalline layer of the reaction product of the urea and calcium sulfate having a greenish-yellow tinge indicating the presence of elemental sulfur. The retention of sulfur in the reaction product layer is also established, of course, by the fact that the sulfur is taken up in the product during the reaction period.

While some acceptable particulate product was obtained in each one of these operations, the products of Examples 9 and 12 using 10 weight percent sulfur and 10 weight percent water, were superior to the remaining products. The presence of substantial amounts of elemental sulfur, to some extent, also influences the properties of the finished product. This is apparent from comparison of Examples 7 and 8 using 5 and 10 weight percent sulfur, respectively. A uniform, evenly coated product was obtained in Example 7 at 5 percent sulfur and 8.5 weight percent added water. However, increasing the sulfur content to 10 weight percent to Example 8 promoted minor agglomeration although the great majority of the product consisted of evenly coated nitrifier particles. Similar effects were observed in Examples 10 and 11 employing 20 and 15 weight percent sulfur, respectively. In both cases some particle segregation and dusting were observed.

EXAMPLE 13

The procedure described in Examples 1 through 6 was employed to produce a 1000 gram batch of multi-component particles containing urea, gypsum and elemental sulfur. These particles were produced by mixing 73.9 parts urea, 25 parts gypsum (as received), 2.5 parts added free water and 6.1 parts reagent grade sublimed sulfur. All of these materials were combined and continously mixed while heating to a temperature of 245° F. The product consisted of uniformly coated particles containing sulfur, urea and gypsum. A sample of these particles was separated from the remainder of the reaction product and analyzed for nitrogen, calcium and sulfur. This analysis indicated that the particles contained 36.3 weight percent nitrogen, 4.6 weight percent calcium and 9.02 weight percent sulfur.

EXAMPLE 14

This operation involved an attempt to produce a combination of urea prills and elemental sulfur in the absence of calcium sulfate. 200 grams of urea prills were mixed with 100 grams of reagent grade sublimed sulfur in a 1000 milliliter flask provided with a heating mantle. The mixture was continuously stirred while the temperature was gradually increased. Little or no association of sulfur and urea particles was observed. This was true even after the temperature had been increased to 200° C. By the time the temperature had reached 175° C., the sulfur had melted into a uniform mass and floated on top of the urea.

The following examples illustrate procedures that can be used to produce combinations of nitrifier particles, calcium sulfate and additional components.

EXAMPLE 15

A particulate combination of urea, gypsum and sodium borate can be produced by mixing 74 parts of urea prills, 25 parts of the commercial gypsum described in Examples 1 through 6 (as received), 2.5 parts water and an amount of sodium borate corresponding to 0.1 part elemental boron. This mixture is then heated to a temperature of 245° F. and allowed to cool to recover the aggregate particles comprising a urea core surrounded by the reaction product of urea and calcium sulfate containing sodium borate.

EXAMPLE 16

The operation of 15 can be employed to produce a combination of urea, calcium sulfate and zinc oxide by substituting for the sodium borate an amount of zinc oxide corresponding to 2 parts of elemental zinc.

EXAMPLE 17

Combinations of ammonium nitrate prills, calcium sulfate and one or more of magnesium, manganese, copper and molybdenum oxides or sulfates can be produced by mixing 25 parts of the gypsum described in Examples 1 through 6 (as received), 2.5 parts water, 75 parts of ammonium nitrate prills, and amounts of the noted oxides and/or sulfates corresponding to 1 parts of the elemental metal, heating the resulting mixture to a temperature of 235° F. and cooling to recover the reaction product comprising particle-form combinations of the oxides and/or sulfates, ammonium nitrate and the reaction product of ammonium nitrate and gypsum.

I claim:

1. The method of producing a particulate multicomponent soil amendment containing at least about 40 weight percent of a particle-form nitrifier selected from the group consisting of urea, ammonium nitrate and combinations thereof, an amount of calcium sulfate corresponding to at least about 10 weight percent of said amendment and sufficient to form the reaction product layer encapsulating said soil additive hereinafter detailed, and an agronomically effective amount of at least one additional soil additive selected from elemental sulfur, phosphates, borates and compounds having cations selected from the group consisting of potassium, calcium, iron, magnesium, boron, manganese, copper, zinc and molybdenum, said method including the steps of intimately mixing finely divided calcium sulfate dihydrate, particles of said nitrifier, and said additional soil additive under substantially anhydrous conditions, and reacting said calcium sulfate with said particle-form nitrifier at an elevated temperature sufficient to promote the endothermic reaction of said calcium sulfate and nitrifier and below the melting point of said nitrifier, and produce said multicomponent soil amendment comprising said particle-form nitrifier coated with a layer of the reaction product of said hydrated calcium sulfate and said nitrifer containing said additional soil additive.

2. The method of claim 1 wherein said calcium sulfate is intimately mixed with at least about 2 weight percent of finely divided elemental sulfur based on the total weight of said particulate soil amendment prior to the reaction of said calcium sulfate and particle-form nitrifier.

3. The method of claim 2 wherein said temperature is raised to a level above the melting point of said sulfur and the resultant molten sulfur is dispersed throughout said layer of said calcium sulfate-nitrifier reaction product.

4. The composition formed by the method of claim 2 comprising said nitrifier particles coated with a layer of the reaction product of said calcium sulfate and particulate nitrifier containing at least 2 weight percent elemental sulfur based upon the total weight of said soil amendment.

5. The method of improving the agronomic quality of soil which comprises adding to said soil at least about 10 pounds per acre of the particulate soil amendment of claim 4.

6. The method of claim 1 wherein the mixture of said calcium sulfate and nitrifier is heated to a temperature of at least about 210° F. sufficient to drive off water of hydration released by said reaction, and said particle-form nitrifier comprises prills of urea or ammonium nitrate or both having particle sizes ranging between about 5 and about 30 mesh.

7. The method of claim 1 wherein said phosphates and borates are selected from the group consisting of ammonium, calcium, sodium, potassium, magnesium, zinc and copper phosphates and borates, and said compounds of said cations are selected from the group consisting of oxides, carbonates, sulfates, nitrates, hydroxides and carboxylates of $C_1$–$C_8$ mono- and dicarboxylic acids.

8. The method of claim 1 wherein said mixture of calcium sulfate and nitrifier particles contains an amount of free water corresponding to at least about 2 weight percent based on said calcium sulfate and below the level at which said nitrifier is dissolved or melted during said reaction.

9. The particulate multicomponent soil amendment comprising nitrifier particles coated with a layer of the reaction product of said hydrated calcium sulfate and nitrifier containing said additional soil additive produced by the method of claim 1.

10. The method of improving and conditioning soil, including the steps of applying to said soil an agronomically effective amount of a particulate soil amendment of claim 9.

11. The method of claim 10 wherein said soil is a basic soil having a pH above about 8.

12. The composition of claim 9 wherein said nitrifier particles comprise urea prills.

13. The particulate soil amendment of claim 9 further comprising a moisture inhibiting amount of a hydrophobic organic moisture inhibitor.

14. The method of claim 1 wherein said phosphates and borates are selected from the group consisting of ammonium, calcium, sodium, potassium, magnesium, zinc and copper phosphates and borates, and said compounds of said cations are selected from the group consisting of oxides, carbonates, nitrates, hydroxides and carboxylates of $C_1$ to $C_8$ mono- and dicarboxylic acids.

* * * * *